(12) United States Patent
Buese et al.

(10) Patent No.: US 10,532,294 B2
(45) Date of Patent: Jan. 14, 2020

(54) CONTINUOUS EXTRACTOR, CONCENTRATOR, DRYER, AND ISOLATOR

(71) Applicants: Mark A. Buese, Gainesville, FL (US); Rudy Strohschein, Micanopy, FL (US)

(72) Inventors: Mark A. Buese, Gainesville, FL (US); Rudy Strohschein, Micanopy, FL (US)

(73) Assignee: BREVETS, LLC, Lewes, DE (US)

( * ) Notice: Subject to any disclaimer, the term of this patent is extended or adjusted under 35 U.S.C. 154(b) by 242 days.

(21) Appl. No.: 15/318,497

(22) PCT Filed: Jun. 15, 2015

(86) PCT No.: PCT/US2015/035857
§ 371 (c)(1),
(2) Date: Dec. 13, 2016

(87) PCT Pub. No.: WO2015/192137
PCT Pub. Date: Dec. 17, 2015

(65) Prior Publication Data
US 2017/0128855 A1 May 11, 2017

Related U.S. Application Data

(60) Provisional application No. 62/011,986, filed on Jun. 13, 2014.

(51) Int. Cl.
*B01D 11/02* (2006.01)
*B01D 9/00* (2006.01)
(Continued)

(52) U.S. Cl.
CPC ........ *B01D 11/0207* (2013.01); *B01D 9/0009* (2013.01); *B01D 9/0036* (2013.01);
(Continued)

(58) Field of Classification Search
CPC .............. B01D 11/0207; B01D 11/028; B01D 11/0292; B01D 11/029;
(Continued)

(56) References Cited

U.S. PATENT DOCUMENTS 1,334,552 A * 3/1920 Reese ................ B01D 11/0219
422/269
2,123,212 A * 7/1938 Scholler ............. B01D 11/0219
422/281

(Continued)

*Primary Examiner* — Liam Royce
(74) *Attorney, Agent, or Firm* — Saliwanchik, Lloyd & Eisenschenk (57) ABSTRACT

Continuous extraction concentration and isolation units are constructed with at least one extraction chambers containing extractable material. Without disruption of total fluid flow in the unit: an extraction chamber completely depleted of extract can be refilled with fresh extractable material or can be replaced with an extraction chamber containing fresh extractable material. Extract are continuously separated from one or more solvents in expansion chambers and removed. All solvents can be retained within the unit. One or more compressors circulate the fluids through the extraction chambers, the expansion chamber, and a condenser, where the expansion chamber and the condenser can be coupled as a heat exchanger. One or more isolators can be included for selectively removing components that are extracted from the plant material without disruption of the process and provide the removed components in concentrated or pure form.

8 Claims, 8 Drawing Sheets

(51) Int. Cl.
*C11B 1/10* (2006.01)
*B01D 15/36* (2006.01)
*B01D 15/18* (2006.01)

(52) U.S. Cl.
CPC .......... *B01D 9/0068* (2013.01); *B01D 11/028* (2013.01); *B01D 11/0292* (2013.01); *B01D 11/0296* (2013.01); *B01D 15/1885* (2013.01); *B01D 15/1892* (2013.01); *B01D 15/361* (2013.01); *C11B 1/10* (2013.01)

(58) Field of Classification Search
CPC ...... B01D 11/02–0276; B01D 15/1885; B01D 15/361; B01D 15/1892; B01D 9/0068; B01D 9/0036; B01D 9/0009; C11B 1/10
See application file for complete search history.

(56) References Cited

U.S. PATENT DOCUMENTS

| | | | | |
|---|---|---|---|---|
| 2,840,459 | A * | 6/1958 | Karnofsky | A23F 5/206 422/268 |
| 4,981,579 | A * | 1/1991 | Paspek | B01D 11/02 208/13 |
| 5,512,285 | A * | 4/1996 | Wilde | B01D 11/0288 424/756 |
| 2014/0110329 | A1* | 4/2014 | Kemper | B01D 33/067 210/327 |
| 2014/0163247 | A1* | 6/2014 | Buese | B01D 11/0219 554/8 |

* cited by examiner

CONTINUOUS EXTRACTOR, CONCENTRATOR, DRYER, AND ISOLATOR

CROSS-REFERENCE TO RELATED APPLICATIONS

This application is the U.S. national stage application of International patent application no. PCT/US/2015/035857, filed Jun. 15, 2015, which claims the benefit of U.S. Provisional Application Ser. No. 62/011,986, filed Jun. 13, 2014, the disclosures of which are hereby incorporated by reference in their entireties, including all figures, tables and drawings.

BACKGROUND OF THE INVENTION

The extraction process has been used for centuries for the isolation of desirable materials. The process involves the mixing of a solvent with extractable material, separation of the solution that is formed, and removal of the solvent from the solute, a desired material.

U.S. Pat. No. 5,512,285, to Wilde, teaches a batch process for extraction of organic components from plant material. The process uses tetrafluoroethane as the extraction solvent. The process allows extraction of some desired components at near ambient temperatures, and is economical relative to super critical $CO_2$ extractions at high pressure. The system uses a tumbler to mix solvent and plant material in a sealed extractor, which is connected to an evaporator that is warmed in an immersion bath with a heater, the evaporator is connected to a compressor to effectively remove and retain the majority of the expensive solvent and return it to the extractor, if needed. The evaporator was the receiver for the extract, which, when the evaporator dropped in pressure to zero psig, the evaporator was opened and the extract drained from the evaporator. The evaporator is then connected to the compressor and heated to recover virtually all the solvent. The system uses a single solvent and produces a single product that is a mixture of chemicals.

A system permitting extraction and at least partial separation of different components is desirable that retains solvent nearly quantitatively, is cost effective, energy efficient, and can permit an effectively continuous operation is desirable. A system where purified chemicals are separated from the extract is desirable.

BRIEF SUMMARY OF THE INVENTION

A continuous unit for the extraction and isolation of a desired product from plant or other extractable material is presented that allows the isolation of the product in a concentrated form, the recycling of the extraction solvent, and the drying of the extracted plant material while all are fully contained within the unit. The isolated product is continuously removed from the unit. The unit employs a at least one extraction chamber such that plant material can be removed and replaced without halting the extraction process in other extraction chambers or portions of an extraction chamber. The continuous unit can include continuous isolators for selectively removing components that are extracted from the plant material without disruption of the process and provide the removed product as a mixture that is concentrated or absent selected components or is isolated in a pure or nearly pure form.

Embodiments of the invention are directed to a continuous extraction, concentration and isolation unit and methods of using the continuous extraction and isolation unit, which can be envisioned as a self-contained chemical production plant. A continuous extraction, concentration and isolation unit, comprising: at least one extraction chamber, wherein each of the extraction chambers comprises one or more valves or other means to direct a fluid flow, and wherein the extraction chamber contains extractable material for extraction of at least one extract comprising at least one solute by at least one solvent when under fluid flow, and, wherein the at least one extraction chamber, is, optionally, a continuous extraction chamber having directing valves to direction flow between portions of the continuous extraction chamber to allow addition of the extractable material, removal of air, introduction of the solvent, drying of spent extractable material, and removal of the spent extractable material independently from the portions of the continuous extraction chamber without disruption of the fluid flow; at least one expansion chamber comprising a solution inlet positioned downstream of the extraction chambers, wherein the solution inlet consists of a expansion valve that allows a pressure drop that promotes formation of a low pressure vaporized solvent from the solution and areolation, coalescence, and consolidation of the solute as a liquid extract or concentrated solution extract; at least one condenser, wherein the vaporized solvent is condensed to a liquid solvent, wherein at least one expansion chamber, and at least one condenser consists of one of at least one heat exchanger, wherein heat from the condenser is absorbable by the expansion chamber; at least one compressor positioned upstream of the condenser and extraction chambers, and downstream of the expansion chambers, wherein the at least one low pressure vaporized solvent is in fluid communication with one of the at least one compressor wherein the low pressure vaporized solvent can be the same or different; at least one pump or valve for continuously or periodically removing the at least one extract without disruption of the fluid flow, wherein when a plurality of extraction chambers are included, removing one of said plurality of extraction chambers when the extractable material has been freed of the solute and replacing the removed extraction chamber with an equivalent extraction chamber with fresh extractable material can be performed without disruption of fluid flow through at least one of the extraction chambers and replacing the removed extraction chamber with an equivalent extraction chamber having fresh extractable material, and wherein the solvent is retained within the unit, and one or more means of concentrating or isolating different chemical components from the extractable material, the means comprising: one or more controlling valves to direct the solvent or the vaporized solvent to a jacket of an extraction chamber and/or to a solvent heat exchanger situated before the extraction chamber for cooling or heating to a desired temperature the contents of the at least one extraction chambers, wherein the extract solution formed at the desired temperature is directed to one of the heat exchangers; one or more controlling valves to direct one of a plurality of solvents to the extraction chamber wherein the extraction chambers can individually be in fluid communication with one of the solvents of a plurality of the solvents; and one or more isolators wherein the isolators comprise one or more of a crystallizer for crystallization of a component of the extract or the extract solution, precipitator for precipitation of an amorphous or a semi-crystalline solid of one or more components of the extract or the extract solution, distiller for the distillation of one or more components of the extract or the extract solution, an ion exchange column with an ion exchange medium for removal of one or more acidic, basic, or ion comprising components of the extract or the extract solution, and a continuous liquid chromatograph for the chromatographic separation of at least one component of the extract or the extract solution.

The method of extracting and concentrating and/or isolating at least one soluble component from extractable material, comprises: providing a continuous extraction and isolation unit as indicated above having at least one extraction chamber containing an extractable material comprising at least one extractable solute; flowing at least one liquid fluid comprising at least one solvent by the at least one compressor, through at least one first conduit into at least one extraction chambers, wherein at least one solution comprising the extractable solute is formed; directing flow of the at least one solution comprising the at least one extractable solute from the at least one extraction chamber into at least one second conduit, wherein the solution comprising the at least one extractable solute is directed into the at least one solution inlet of at least one expansion chamber, wherein the at least one expansion chamber is maintained at a lower pressure than the pressure in the at least one second conduit, wherein the at least one solution comprising the at least one extractable solute is partitioned into at least one solvent vapor and at least one extract comprising the at least one extractable solute, or, alternately, the solution comprising the at least one extractable solute is directed to one or more isolators, wherein at least one component of the at least one extractable solute is removed to provide a concentrated product or an isolated product from each of the isolators and the balance of the solution comprising the at least one extractable solute constituting one or more second solutions comprising at least one extractable solute that is directed into the at least one solution inlet of at least one expansion chamber, wherein at least one second extract is separated from the at least one solvent; optionally, directing one or more of the at least one extract or the at least one second extract to at least one isolator, wherein at least one component of the extract or second extract is removed to provide at least one additional or alternate concentrated product or at least one alternate or additional isolated product from each of the isolators; and as needed removing and replacing one of the plurality of extraction chambers, or repositioning the one or more portions of the continuous extraction chamber, wherein the extraction and concentration or isolation are carried out continuously.

DETAILED DESCRIPTION OF THE INVENTION

Embodiments of the invention are directed to a continuous immersion extraction system. The extraction system consists of a unit comprising a plurality of extraction chambers that are individually addressed. The extractable material can be plant material or any other extractable material that, generally, can be handled as a solid. Sludge or liquid can be adapted for use in the continuous immersion extraction system. Throughout this disclosure, the extractable material is referenced as plant material or extractable material, but it is to be understood that any extractable material can be employed when referred to a plant material, including but not limited to animal matter, soil, and other mineral matter. The extractable material can be a previously extracted mixture, where one or more components of the extract are crystalline and can remain so in a subsequent extraction as a means of removing other components to purify desired crystalline materials. In this manner, the extraction chambers can be the primary site, or a secondary site, for the isolation of a valuable component. The extraction system employs a separation chamber, which is an expansion chamber, where a solvent from a solution is vaporized, with the formation of an aerosol comprising one or more solutes that consolidates into an extract. The extraction chambers are independently: in a state of having plant material being extracted by a solvent, wherein the desired extract is a solute of a solution that is formed; in a state of being washed of residual solute and solution residing in the vicinity of the extracted material; in a state of removal of residual solvent, such that the extracted (spent) plant material can be prepared for removal from the unit; or in a state of being removed from the unit and replaced with an equivalent extraction chamber containing fresh plant material for extraction. The extraction system retains nearly all solvent within the system without losses of almost any solvent to the environment. The extraction system allows the continuous removal of the extract from the system. The extraction process is carried out in a manner where energy consumption is minimized, spent plant material is easily and safely disposed of as waste or employed as a useful by-product, and all other material is recycled solvent or the desired extract. The system can be constructed to couple heat absorbing and heat releasing portions of the system as a heat exchanger, which minimizes energy consumption.

The continuous extraction and separation system many of the components that are described in WO2014093573, which is incorporated in its entirety herein, where additional features are included to allow for use of different solvents, crystallizers, chromatographic separators, or resin columns where components from the extractable materials are selectively extracted and/or separated from the mixture. The separated components may be mixtures of chemicals or essentially pure chemicals.

Convenient solvents that can be used in a system are solvents that are readily vaporized at temperatures of about 25° C., however, less volatile solvents can be used in a system that employs inlet pressures less than ambient in portions of the system.

Although the continuous extraction system is designed as a closed system, some will be concerned due to the "global warming potential" (GWP) of a solvent. Those with such concerns can use, for example, HFC-41 (fluoromethane) (GWP=92), HFC-152a (1,1-difluoroethane) (GWP=124), HFC-152 (1,2-difluorethane) (GWP=53), HFC-161 (fluoroethane) (GWP=12), HFO-1234yf (2,3,3,3-Tetrafluoropropene) (GWP=4), HFO-1234ze (trans-1,3,3,3-tetrafluoroprop-1-ene) (GWP=6), or other low GWP solvents. In other embodiments of the invention, the solvent can be non-fluorocarbons, such as methyl ether, methane, butane, propane, ammonia, trimethyl amine, or sulfur dioxide; although concerns with flammability and other factors must be anticipated and appropriate safety features must be considered. Choice of solvent can be made to optimize a specific chemical to be extracted. Compressors are commercially available that can maintain a low pressure side of less than one atmosphere and a high pressure gas in excess of one atmosphere at an elevated temperature, hence, more traditional organic solvents can be used.

In embodiments of the invention, the extract may be chemically bound to the plant material. The inclusion of one or more inlet ports within the continuous extraction system for the injection of catalyst and/or reagents for cleavage of a desired extract, or a derivative thereof from the injected reagent, can be included in the conduits prior to or as a portion of the extraction chamber. In other portions of the continuous extraction system, one or more traps, either resins, absorbents, or physical traps, for example, cooling for selectively solidifying catalyst and/or reagent can be included to remove catalysts and/or unreacted reagents injected into the system. These traps can be in any portion of the system downstream of the extraction chambers in the fluid flow and upstream of the site of injection of catalysts and/or reagents. In general, such traps will be constructed with a redundancy and appropriate connectivity, to permit the switching from one trap to an equivalent without interruption of the flow to carry out maintenance of the effectively filled trap.

In an embodiment of the invention, a plurality of continuous immersion extraction components may be effectively combined into a single continuous immersion extraction system, where components of the extractable material are extracted as a first extract in a first continuous immersion extraction portion with a first solvent and the extracted material dried, before and subsequently extracting of the once extracted extractable material with a second solvent in a coupled second extraction component, wherein the second solvent extracts a second extract in a second extraction system that is coupled with the first to share some portions thereof, for example, the extraction chambers and some conduits to and from the extraction chambers, where the systems are separated by at least valves within the system.

The compressor can be of any design and can be one that requires oil or is oil-free. If oil is employed in the compressor, the oil can be of any type, including, but not limited to, hydrocarbon, fluorocarbon or silicone oil.

The system can be used with pressures that are higher than normal air pressure, 14.7 psi. For example, the low-pressure side of the compressor may be 20 to 50 psi and the high-pressure side of the compressor may be 50 to 200 psi. Materials of construction for the extraction unit are those which may contain pressures in excess of the highest pressure of the system. For example, metal or metal alloys are useful materials of construction, although other materials may be used when they are capable of withstanding the high pressures of the system.

Figure 1:
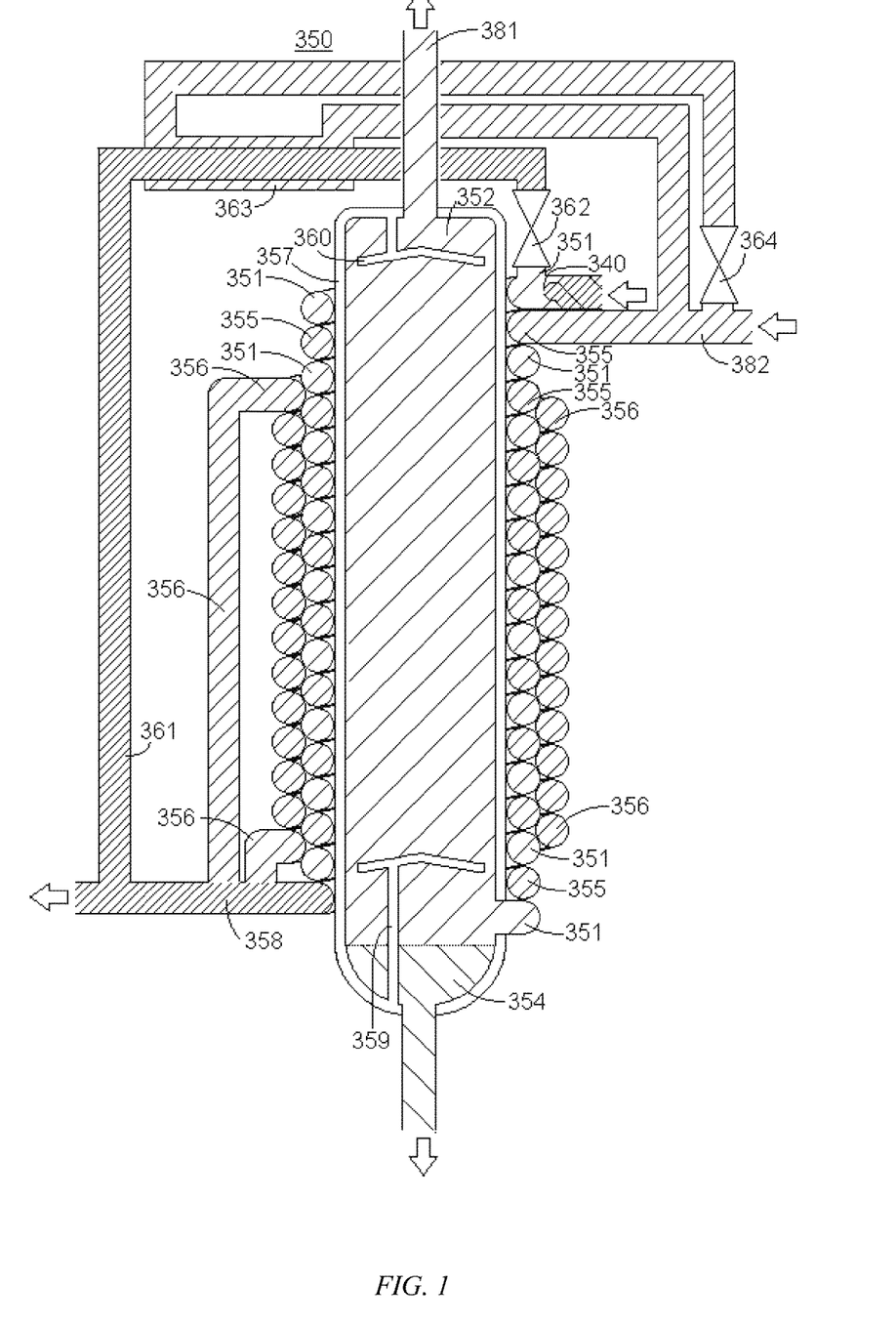
FIG. 1 shows a cross-section of a heat exchanger that combines the separation chamber and the condenser of the continuous extraction system, according to an embodiment of the invention, where a periodic cleaning of the separation chamber can be carried out.

Although many different designs may be used, the cross-section of a heat exchanger 350 that can be used, in a continuous extraction system, according to an embodiment of the invention, is shown in FIG. 1. In this heat exchanger 350, hot high-pressure vapor enters the top of the first portion of coiled condenser 355 of the heat exchanger 350 from conduit 382. The coiled condenser 355 spirals from the top of the heat exchanger 350 in intimate contact with a heat sink 357 and coiled expansion chamber 351, where the condenser coils 355 and expansion coils 351 alternate as they proceed downward along heat sink 357. The thermal expansion valve 340 delivers an extract solution into the low-pressure expansion coil 351 where vaporization of the solvent of the solution occurs upon the absorption of heat from the contacting coiled condenser 355 and the heat sink 357. The high-pressure solvent vapor condenses in this coiled condenser 355 and flows into the exit conduit 358, as shown in FIG. 1. Any equilibrium high-pressure solvent vapor can enter an exterior coiled second portion of the condenser 356 where the solvent vapor is further cooled by the external environment or, as desired, by a second cooling source to assure condensing of the solvent vapor into liquid solvent. The fluid extract drains to a collection port 354 and the low pressure solvent vapor rises through the trap 352 chamber around the heat sink 357 exiting into the low pressure solvent vapor conduit 381 that ultimately leads to the compressor. To assure that extract is not entrained as an aerosol to the compressor; baffles 359 and 360 are constructed, but are not necessarily required, near the entrance and exit of the low-pressure vapor into trap 352.

In FIG. 1, the heat exchanger 350 is illustrated with an optional conduit 361 that permits the diversion of liquid solvent to the expansion chamber 351 by the control of an optional valve 362 that can be actuated manually or automatically, as needed, for introduction of liquid solvent to wash the internal surface of the expansion chamber, for example, if solids form upon loss of solvent. As shown in FIG. 1, conduit 361 can enter an optional heater 363, which can be a heat exchanger that uses hot high-pressure vapor that is diverted to the heat exchanger 363 by optional valve 364, which can be controlled manually or automatically. Not shown are any flow or heat sensors that may be included for monitoring the flows and effective heating to the diverted liquid solvent. Flow sensors at the exit to the collection port 354 and the low pressure solvent vapor conduit 381 are not shown but can be employed to monitor any need for the injection of liquid solvent through optional valve 362. Any heat exchange employed in the continuous extraction system can include a manner to remove any solids that form in a continuous or intermittent manner that allows operation of the continuous extraction system in an effectively continuous manner.

Figure 2:
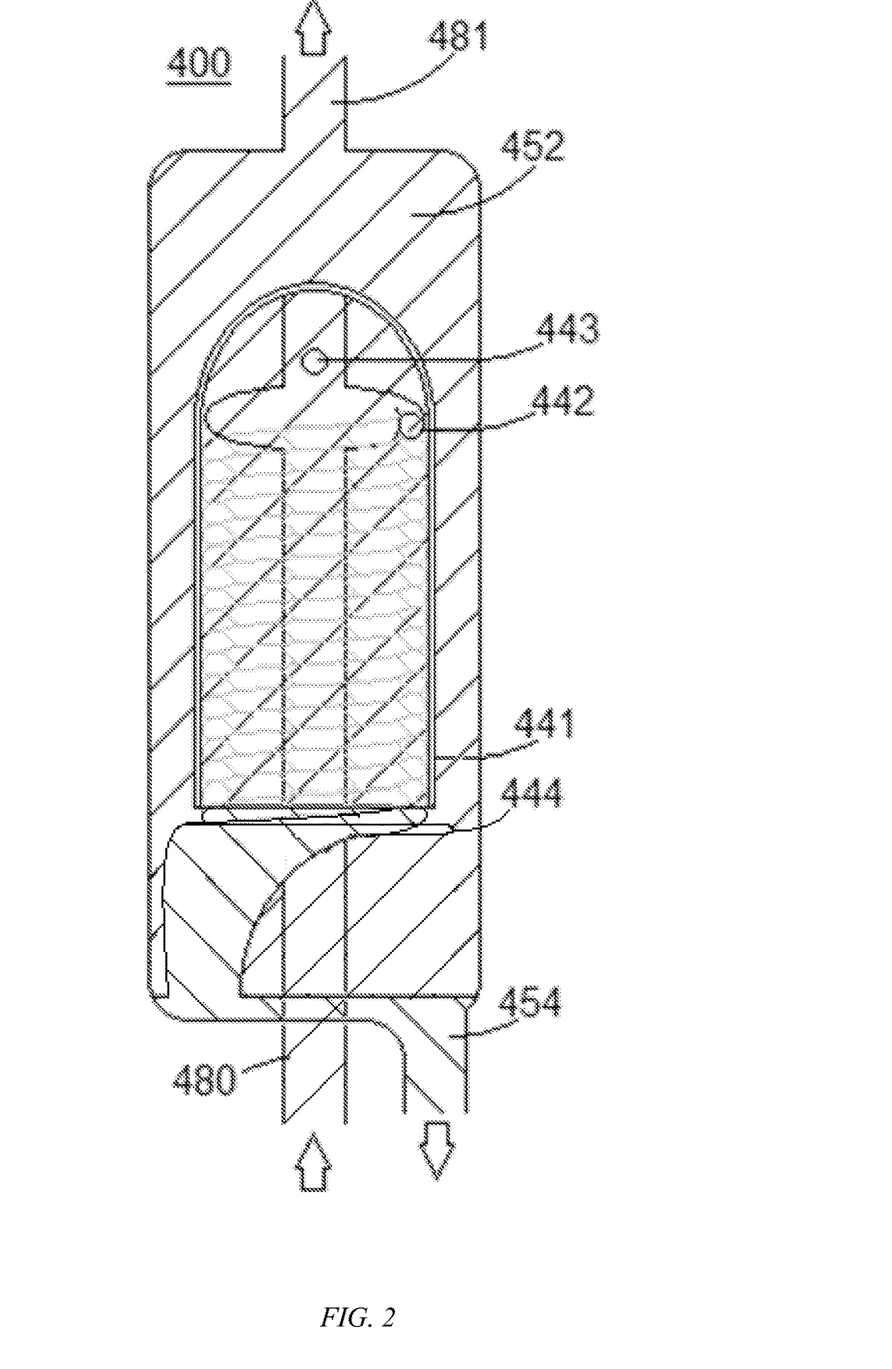
FIG. 2 shows a consolidator for inclusion into a conduit from the low pressure gas exit from the trap chamber of a heat exchanger where any aspirated extract is consolidated with a centrifugal force and permitted to drain to the extract receiver and concentrator, according to an embodiment of the invention.
Figure 3:
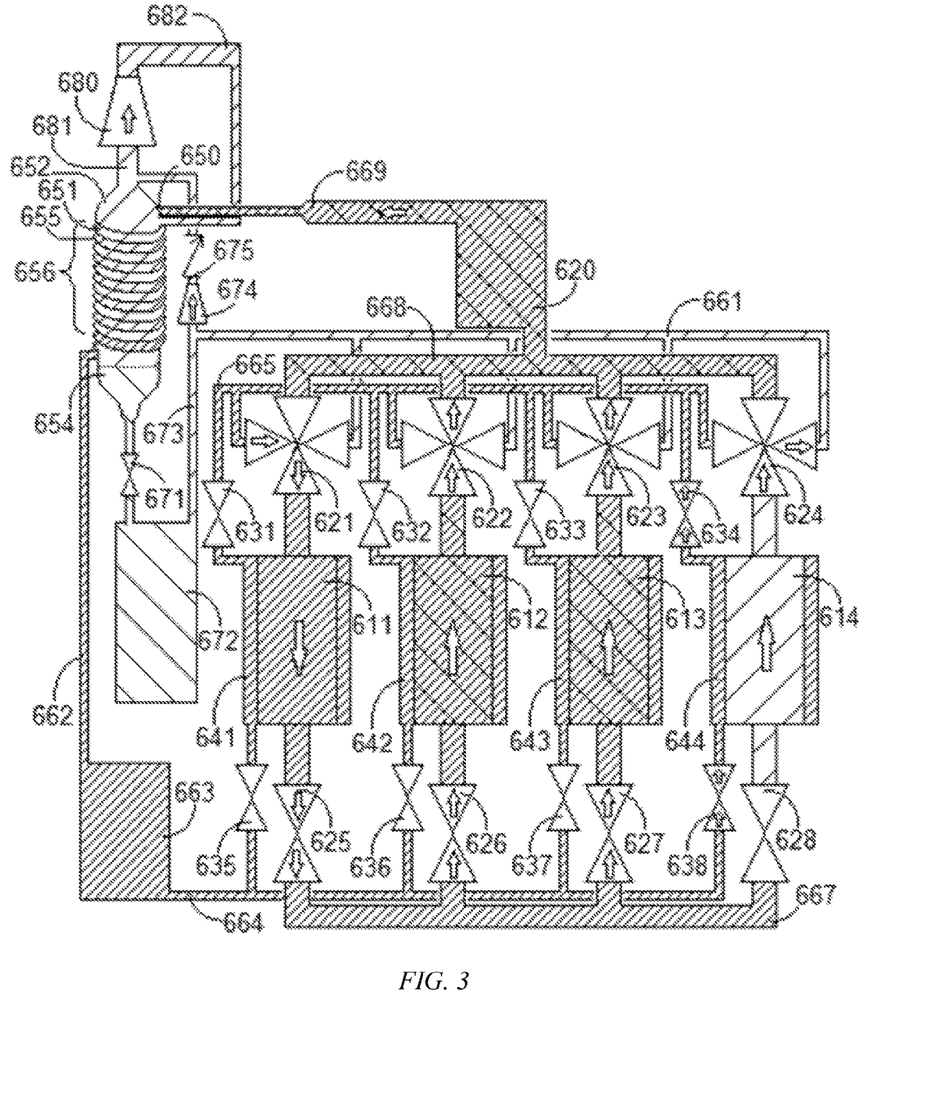
FIG. 3 shows a schematic drawing of a continuous extraction system, according to an embodiment of the invention.

Referring to FIG. 1, a consolidator can be included at the exit of the expansion chamber 351 connected through low pressure solvent vapor conduit 381. The consolidator is effective at preventing any aerosolized extract from being carried to the compressor and redirects liquid back to the collection port 354 or a receiver for the extract downstream of the collection port 354. The consolidator 440 can be of a structure, as shown in FIG. 2, where an aerosol entering from entry conduit 480 is directed upward into a cross shaped director 442 that causes any remaining aerosol to be forced against an extract drain housing 441 in a spiral fashion with the housing being of significantly greater cross-section and volume than that of the entry conduit 480 and cross shaped director 442 such that there is a large drop in the velocity of the solvent vapor. An additional controlling outlet 443 allows for a moderation of the velocity of the aerosol stream from the cross shaped director 442. In this manner, the liquid extract consolidates and drains to a deflection plate 444 to avoid formation of significant aerosol from agitation of the fluid extract consolidating below the deflection plate 444 of the an extract drain 454, which is directed to the collection port 354 or a receiver for the extract, as the solvent vapor exits the extract drain housing 441 into a yet greater volume of the consolidator 400 before exiting through an exit conduit 481 into the extraction chamber outlet 681, as shown in FIG. 3, for entry into the compressor 680 of the continuous extraction system. The invention is not limited by the design of the consolidator shown in FIG. 2 as other designs are possible for the consolidator. Filters and/or absorbers can be included after the exit conduit 481 to assure effective removal of all liquid extract from the solvent vapor before reintroduction into the compressor.

In an embodiment of the invention, a continuous extraction system can be used with nearly any solvent. FIG. 3 shows a single compressor continuous extraction system comprises a multiplicity of jacketed extraction chambers 611, 612, 613, and 614. Fluid from solvent reservoir 663 is directed through jacket inlet valve 638 with jacket inlet valves 635, 636, and 637, as well as jacket outlet valves 631, 632, and 633, in closed positions to isolate jackets 641, 642, and 643. The solvent exits jacket 644 through jacket outlet valve 634 into conduit 665 that delivers solvent to extraction chamber 611 through valve 621. The plant material of extraction chamber 611 is nearly spent of the extract and, as shown, experiences twice the individual fluid flow rate of extraction chambers 612 and 613. Although not necessary, this is advantageous for rapidly removing the last portions of extract on the plant material in extraction chamber 611. The very dilute extract solution exits extraction chamber 611 exits through valve 625 into conduit 667 that feeds extraction chambers 612 and 613 through valves 626 and 627. The concentrated extract solution from extraction chambers 612 and 613 flows through valves 622 and 623 into conduit 668 to an optional extract solution reservoir 620. Extract solution reservoir 620 feeds concentrated extract solution through conduit 669 to the expansion valve 650 of expansion chamber 651 in a heat exchanger 656, which suggests, but is not necessarily, the design shown in FIG. 1 for the heat exchanger.

In the manner illustrated in FIG. 1, the extract drains to the collection port 654 of the trap 651 of heat exchanger 656 and drains through extract valve 671 into extract receiver and concentrator 672. Extract valve 671 is periodically opened, or is continuously open to a degree that a column of extract resides in the collection port 654 at the inlet of valve 671 throughout operation of the continuous extraction system. Low-pressure solvent vapor is in equilibrium with the extract in the extract receiver and concentrator 672, which is connected via concentrator conduit 673 to concentrating and evacuating compressor 674. One or more plates or baffles can be situated in extract receiver and concentrator 672 to spread wet extract over a larger surface area and increase the rate of solvent evaporation, and/or a stirrer or other mixer can be included in the extract receiver and concentrator 672. Although not shown, a port with a valve permits the removal of extract from the extract receiver and concentrator 672. The outlet of the concentrating and evacuating compressor extract receiver and concentrator 672 is connected to a check valve 675, which forces low-pressure solvent vapor into trap 652 at the inlet 681 of compressor 680 only when the outlet pressure of the concentrating and evacuating compressor 674 exceeds the low-pressure solvent in the extraction chamber outlet 681. This permits generation of a vacuum in the extract receiver and concentrator 672 to remove nearly all solvent from the extract. A vacuum of, for example, 20 Torr, for example, 10 Torr, for example, 5 Torr, for example, 1 Torr or less, can be achieved in the extract receiver and concentrator 672 to allow removal of the extract with almost no solvent therein.

The concentrating and evacuating compressor 674 is also connected through conduit 661 through valve 624 to extraction chamber 614. Extraction chamber 614 contains completely spent plant material, which is dried by the vacuum created by extract receiver and concentrator 672. The output high-pressure solvent vapor from compressor 680 is directed through conduit 682 to the condenser 655 portion of the heat exchanger 656 with an output of liquid solvent into conduit 662 to optional liquid solvent receiver 663 prior to introduction to the extraction chambers. As can be appreciated by one of skill in the art, because the extraction chambers 611, 612, 613, and 614 are designed to be removed from the continuous extraction system by appropriate valve alignment, individual extraction chambers can be removed with the extraction solvent within the extraction chamber and the removal of the solvent and drying, can be carried out external to the continuous extraction system, where drying, reloading with fresh extractable material, and filling with fresh solvent can be carried out and the extraction chamber returned to the continuous extraction system. Also, the extract need not pass to an extract receiver and concentrator 672, but can be removed without exposure of the extract to ambient air and any residual solvent can be separated in a concentrator external to the system and the solvent returned to the continuous extraction system after isolation of the extract. In this manner, a concentrating and evacuating compressor 674 within the system is optional. Such operation can be employed to overcome potential problems without additional engineered features, for example, to encourage more rapid throughput in the continuous extraction system, or when solidification of the concentrating extract would facilitate leaving a portion of the solvent in the extract until after the removal of the extract from the system.

Figure 4:
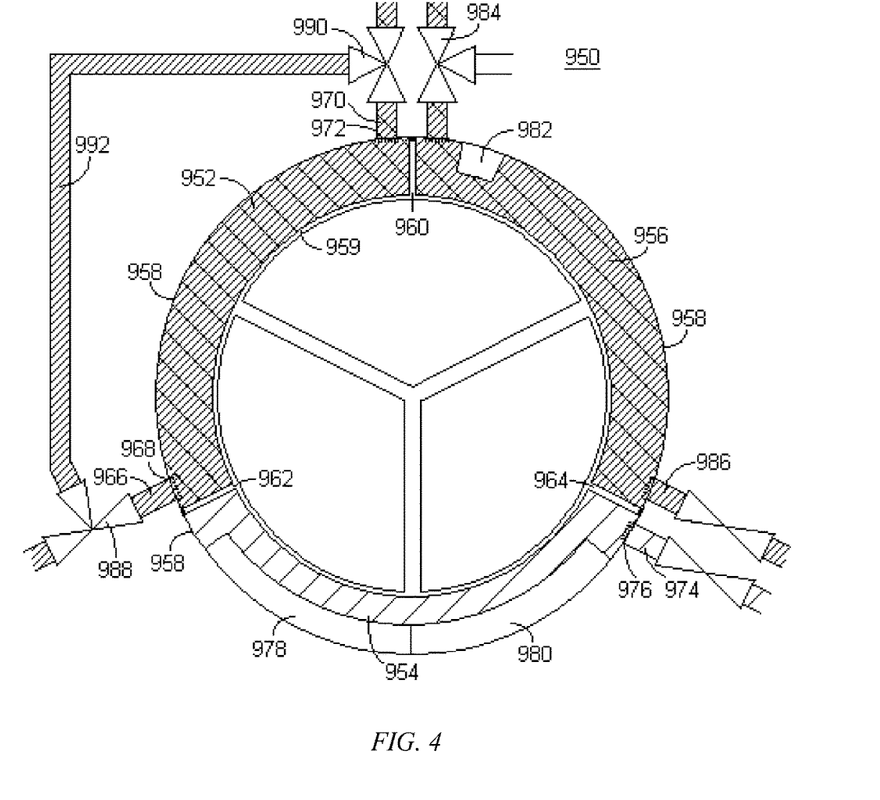
FIG. 4 shows a continuous extraction chamber in the form of a continuous circular tubular extraction chamber, according to an embodiment of the invention.

Although the continuous immersion extraction system is advantageously employed with a plurality of extraction chambers as the employment of a plurality of pressures is not facilitated by having any portion of the system open to an ambient pressure and air, in embodiments of the invention a single continuous extraction chamber may be employed. In one embodiment of the invention, the extraction chamber can comprise a three part continuous extraction chamber, where a first portion of the extraction chamber may be under the action of extraction, while a second portion physically separated from the first portion and a third portion by barriers may be under cycles of drying the spent extracted material and removal of the spent material, and the third portion separated from the first and second portion by barriers may be under cycles of refilling with fresh extractable material, removal of air, and filling with solvent. As shown by FIG. 4, for a counter clockwise rotation, a continuous circular tubular extraction chamber 950 can comprise three equally sized portions 952, 954, and 956, with a housing 958 that can form a movable seal 959 with three seals 960, 962, and 964. The shape does not need to be a circular tube, but can also be an oval, square, or rectangular tube. In this manner a solvent inlet port 966, which, optionally, can include an inlet filter 968, can introduce solvent into portion 952 that is situated, as shown, from 240 to 360 degrees (top) of the circular tube extraction chamber 950, with the inlet port 966 situated for flow against gravity of the extract solution through outlet port 970 that has an outlet filter 972. While portion 952 is under extraction, portion 954 is situated in the lower third, from 120 to 240 degrees, and is being drained of solvent through at least one drain port 974 that has a drain filter 976, that leads ultimately via a conduit to the low pressure side of the compressor and, subsequently, to the low pressure side of a concentrating and evacuating compressor. Subsequently, portion 954 can be opened via one or more doors 978 and 980 such that spent plant material can be removed from portion 954. Simultaneous with the extraction within portion 952 and removing of spent plant material in portion 954, portion 956, situated from 0 to 120 degrees, can be filled with fresh plant material through fill port 982, evacuated of air through 3-way outlet valve 984, and solvent can be introduced into portion 956 through inlet port 986. When portion 952 has been fully extracted, the sealed barriers can be displaced 120 degrees to introduce fresh plant material in portion 956 to flowing extraction solvent, and to place portion 952 into the lower third of the circular loop for removal of solvent and spent plant material, and to place portion 954 into position for filling with fresh plant material and introducing solvent to the fresh plant material. During rotation, the solvent flowing into the extraction portion, through 3-way inlet valve 988 can be diverted to 3-way outlet valve 990 through conduit 992 such that the flow to and from the heat exchanger is not disrupted or is only momentarily disrupted for the nearly instantaneous switching, or by employing additional valves, no disruption is necessary. The continuous extraction chamber can be employed with a jacket in the manner indicated in FIG. 3 for non-continuous extraction chambers such that the extraction can be carried out at a desired temperature. In addition or alternatively to the jackets, a heat exchanger can be included in the solvent conduit to heat or cool the solvent before delivery to the continuous extraction chamber or to any individual extraction chamber employed that is not a continuous extraction chamber.

Figure 5:
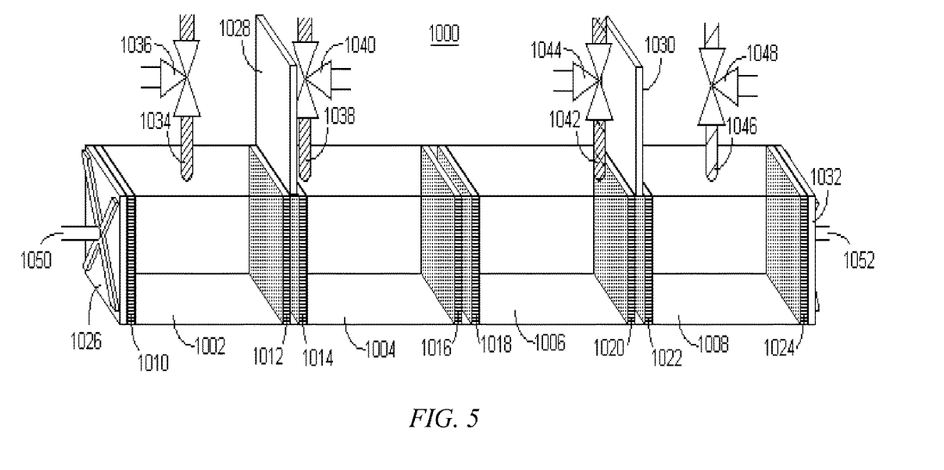
FIG. 5 shows a continuous extraction chamber in the form of a linear unidirectional continuous extraction chamber, according to an embodiment of the invention.

In another embodiment, the continuous extraction chamber can be a linear design. A linear continuous extraction chamber 1000 is shown in FIG. 5 that is partitioned into four rectangular cuboids portions 1002, 1004, 1006, and 1008 designed to migrate from one end to the other (left to right) through a housing (not shown for clarity), but where the shape need not be of a cuboid, for example, the shape can be cylindrical and employed unidirectional. As shown in FIG. 5, portion 1002 has two fritted plates 1010 and 1012 situated at the inline ends of the cuboid. The outer (left) face of the cuboid has a drive door 1026 that has an external drive shaft 1050 and the inner (right) face of the cuboid has an entry door 1028 that is shown in the open position. Portion 1002 is situated in the extractable material loading position, where during loading, a filling door in the housing (not shown) is opened to load portion 1002 with plant material, while the entry door 1028 is in the closed position (down). After closing and sealing the filling door, the cuboid is evacuated through port 1034 when the 3-way valve 1036 is positioned to a vacuum to remove air from the portion 1002. After evacuation, the 3-way valve 1036 is aligned to direct solvent through the port 1034 until the cuboid is filled. Portions 1004 and 1006 are in the early and late extraction positions of the linear continuous extraction 1000. Each has a pair of fritted plates 1014/1016 and 1018/1020 which permit solvent to enter through inlet port 1038 and exit through outlet port 1042 during extraction. Although the linear continuous extraction chamber 1000 shows two portions for extraction; the design is not so limited and the number of central portions can be one to 10 or more. When the linear continuous extraction chamber has three portions, the extraction chamber can be used as a bidirectional extraction chamber permitting entry of fresh plant material from either ends of the extraction chamber. Portion 1008 is in the spent plant material removal position and has two fritted plates 1022 and 1024 situated at the inline ends of the cuboid. The outer (right) face of the cuboid has a pull door 1032 that has an external pull shaft 1052 and the inner (left) face of the cuboid has an exit door 1030 that is shown in the open position. With the exit door 1030 in the closed position, spent plant material is evacuated to remove solvent through port 1146 when 3-way valve 1148 is directed to the low pressure side of the compressor. Subsequently, the 3-way valve 1148 is aligned to the low pressure side of a concentrating and evacuating compressor to effectively remove effectively all solvent. When dry, the dry spent plant material is removed when an emptying door in the housing (not shown) is opened. The two fitted plates 1022 and 1024 are removed and the pull shaft 1052 is reversed to drive the pull door to contact the exit door 1030.

When the plant material in portion 1006 is spent, entry door 1028 and exit door 1030 are placed in the open position (up). Drive shaft 1050 then drives portion 1002 such that portions 1002, 1004 and 1006 are transferred to the early extraction position, late extraction position, and spent plant material removal position, respectively. Drive shaft 1050 is then reversed to pull drive door 1026 to an extent sufficient to close entry door 1028 and exit door 1030. Stops and spacer can reside in the housing (not shown) such that the portions cannot flow counter to the designed linear direction. Valves 1040, 1044, and 1048 are placed in proper alignment for extraction in portions 1002 and 1004, and evacuate solvent from portion 1006. New or reused fritted plates, for example, the removed 1022 and 1024, are placed in the end positions of the plant material loading position. When drive door 1026 is in its fully retracted position, fresh plant material can be loaded in the new portion situated in the plant material loading position. The continuous extraction chamber need not be linear; a multiplicity of portions may be situated in an effectively circular carousel where drive (end) doors are replaced with doors that can be opened and closed independently, and where any portion or combination of portions can have a common inlet for solvent and outlet for extract solution that can be directed to one or more expansion chambers for the isolation of extracts of differing composition based on the extent of extraction in the portions of the continuous extraction chamber. Again, the continuous extraction chamber can be employed with a jacket in the manner indicated in FIG. 3 for non-continuous extraction chambers such that the extraction can be carried out at a desired temperature. In addition or alternatively to the jackets, a heat exchanger can be included in the solvent conduit to heat or cool the solvent before delivery to the continuous extraction chamber or to any individual extraction chamber employed that is not a continuous extraction chamber.

Although not illustrated, flow meters, flow controllers and sensors for temperatures, fluid density, spectral characteristics, viscosity, or other parameters can be included to determine the quantity of solvent that has passed through each of the plurality of extraction chambers and send an input signal to a microprocessor, which can then control valves to direct the flow of solvent an extract solution. Solvent can be directed to expansion valves in the extraction chamber jackets and to condensers. Hot high pressure vapor can be directed to the extraction chamber jackets or to heat exchangers of any design in various conduits. Additionally, as desired, the extraction chambers can include ultrasonic processors, stirrers, or other means of agitation.

In embodiments of the invention, one or more isolators can be included to isolate one or more components of the extract. The isolator can be one that carries out crystallization, precipitation of an amorphous or semi-crystalline solid, distillation, removal of an acidic, basic, or ion containing component with an ion exchange medium, or a chromatographic separation. In an embodiment of the invention, one or more continuous isolators can be included for isolation of one or more desired components from the extract solution. Referring to FIG. 3, an isolator can be included prior to the expansion valve 650, or can be employed such that extract from collection port 654 or extract receiver and concentrator 672. A solvent used for crystallization, precipitation, ion exchange, or chromatography can be the solvent employed for extraction or can be a different solvent. The isolated product from the isolator can be one of desired value that is isolated in a more concentrated or highly pure form from the extract, or be the extract that has an undesired component removed. Additionally, the continuous extraction system can be configured to extract at different temperatures, degrees of extraction, and/or with different solvents, as addressed below, and any of the extracts or extract solutions can be directed into an isolator, where a plurality of isolators can be included at various sites within the continuous extraction system to perform isolations in series or parallel. For example, the extract solution from the extraction chambers can be passed through ion exchange resins and into a crystallizer, and the extract can be introduced from the collection port for the extract into a chromatographic separator.

Figure 6:
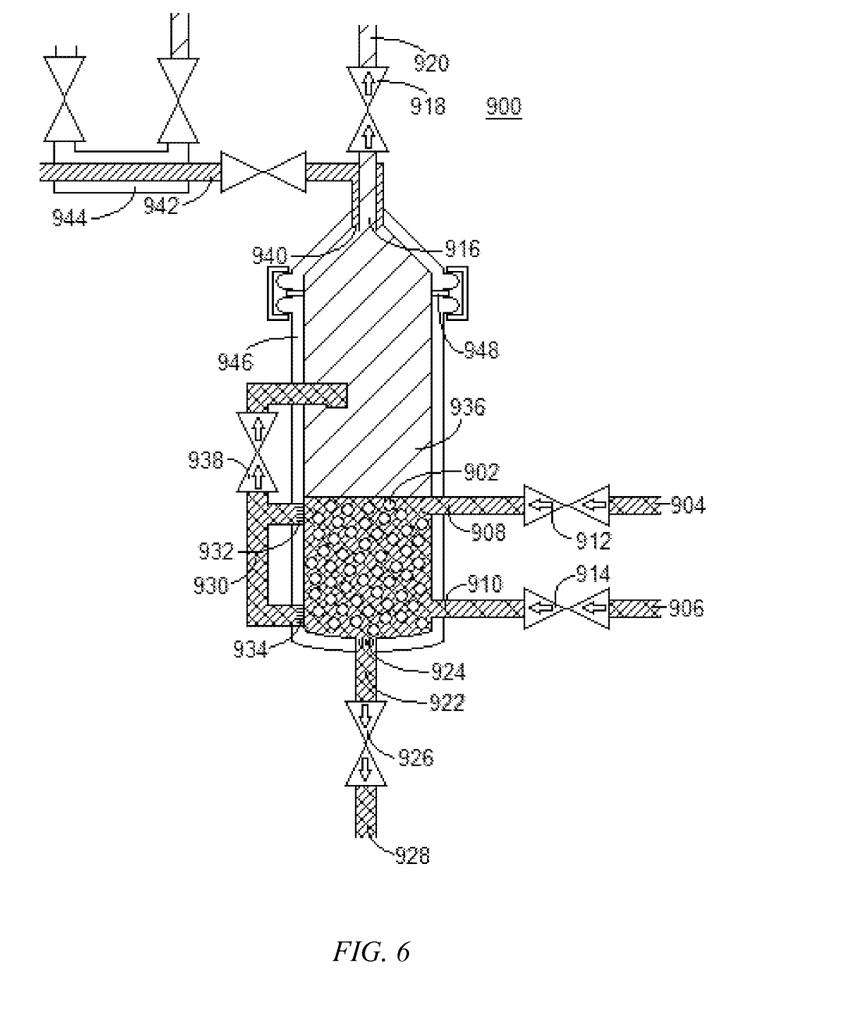
FIG. 6 shows a cross-section of an isolator in the form of a continuous crystallization chamber, according to an embodiment of the invention

As shown in FIG. 6, the isolator can be a continuous crystallization chamber 900 for the isolation of a component in the form of crystals 902, which is included into the continuous extraction unit such that the extraction solution in one or more conduits 904 and 906, for example, but not necessarily, from the extraction chambers enters the continuous crystallization chamber 900 through one or more inlet ports 908 and 910, which are illustrated as situated in a middle or lower portion of the continuous crystallization chamber 900. Alternately to employing the extraction solution, a solution of the extract can be prepared in the extraction solvent or a different solvent to perform crystallization, where this crystallization solvent is retained in separate components to those employed in the extraction portion of the continuous extraction and isolation system. The placement and number of inlet ports 908 and 910 can vary as desired, for example, when the crystals 902 are denser than the solvent, entry into the lower inlet port 910 can be preferable to promote agitation and dispersion of the crystals 902 in the concentrating extract mother liquor, or, for example, when the crystals 902 are less dense than the solvent, entry into the upper inlet port 908 can be preferable to promote agitation and dispersion of the crystals 902 in the concentrating extract solution and to inhibit the formation of a crystalline film that can act as a barrier to evaporation of the solvent from the concentrating extract mother liquor. The inlet ports can include valves 912 and 914.

The surface of the concentrating extract mother liquor is in vapor communication with at least one vapor exit ports 916 that is connected, generally, but not necessarily, through a valve 918 to a conduit 920 that is directed to the low pressure vapor inlet to the compressor of the continuous extraction unit. At the base of the isolator 900, at least one concentrated extract mother liquor outlet port 922 is connected through a filter 924 an extract mother liquor conduit 928, generally through a valve 926, which directs the extract mother liquor ultimately to the expansion valve of the expansion chamber in a heat exchanger or to an additional isolation chamber for isolation of one or more additional components of the extract solution. The isolator 900 can include a circulation loop 930 where the pressure differential, or via an included pump (not shown) draws extract mother liquor through one or more filters 932 and 934 and discharges the concentrating mother liquor into the head space 936 of the isolator 900 and drops onto the liquid surface to promote surface exchange and inhibit formation of a crystalline film that can act as a barrier to the vaporization of the solvent. Optionally, a valve 938 can be included in the circulation loop 930 to control the proportion of the mother liquor that is drawn through the circulation loop 930. The circulation loop 930 can be within a jacket (not shown) through which: solvent can be passed, either for minimal heating of the cooling concentrating extract mother liquor; solvent can be drawn through an expansion valve for cooling of the concentrating extract mother liquor, due to evaporative cooling upon vaporization of the solvent in the jacket; or high pressure solvent vapor from the compressor exit for maximal heating of the concentrating extract mother liquor.

When the isolator 900 has filled with crystals 902 of a desired component, the isolator 900 can be sealed by closure of valves 912 and/or 914 from additional flow of extract solution into the isolator 900 and the remaining concentrated extract mother liquor can be drained from the isolator 900. Via an inlet port 940, solvent for washing of the crystals 902, generally cold solvent that can be cooled in a conduit 942 chilled by a jacket 944 through which solvent can be drawn through an expansion valve (not shown) for cooling of the wash solvent, due to evaporative cooling upon vaporization of the solvent in the jacket 944. Subsequently, the wash solution that is formed can exit the isolator through the concentrated extract mother liquor outlet port 922. When a plurality of isolators 900 are used; the crystal 902 filled isolator 900 can be removed and replaced in the system, and the purified crystals removed from the isolator. The isolator 900 can include an insulating jacked 946, and can be sealed at a joint 948 that allows the contents to be easily accessed for removal. Alternatively, the crystals 902 can be removed by dissolving the crystals 902 in hot solvent added to the washed crystals 902 where heating of the solvent can be achieved via the circulation loop 930 or by heating solvent passed through jacket 944, which can be heated by high pressure solvent vapor from the compressor exit. The isolation chamber 900 can be seeded with crystals of the desired component of the extract prior to carrying out the isolation of the crystal 902 from the extract solution. A plurality of isolators 900 can be included redundantly.

Figure 7:
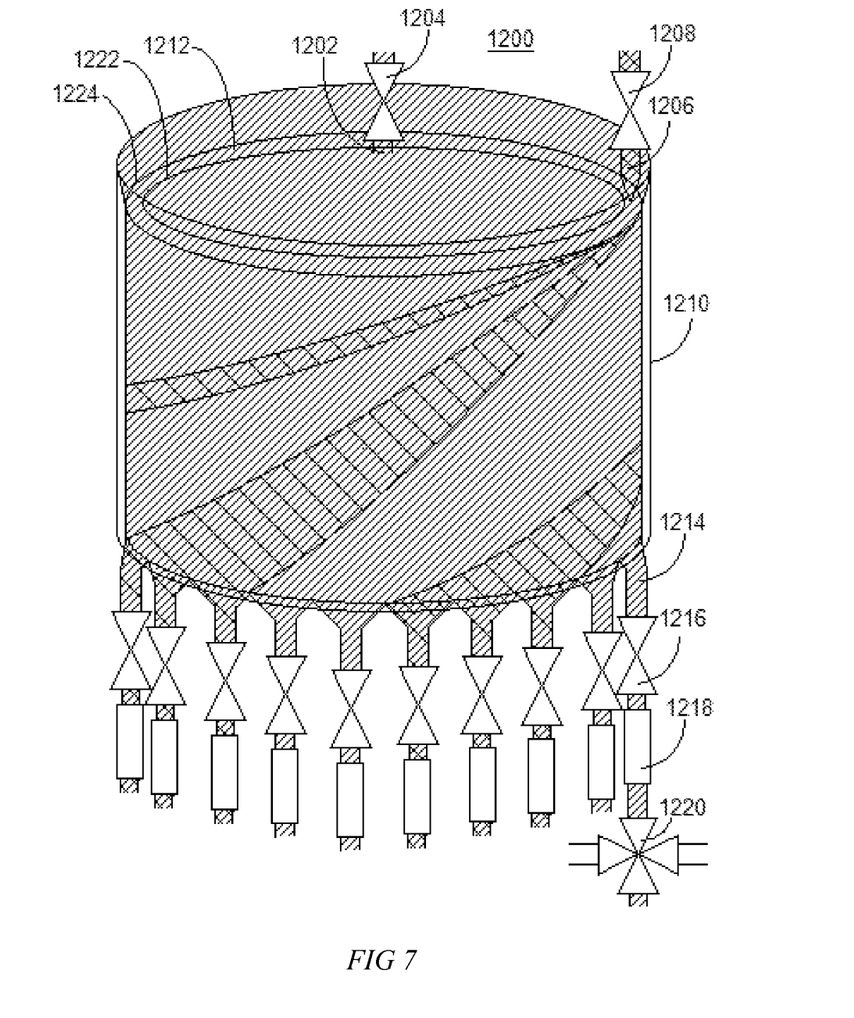
FIG. 7 is a drawing of an isolator in the form of a continuous rotating annular chromatograph, according to an embodiment of the invention.

In another embodiment of the invention, the isolator can be a continuous rotating annular chromatograph. As shown in FIG. 7, the continuous rotating annular chromatograph 1200 is included in the continuous extraction unit to receive a concentrated solution, for example, the concentrated extract mother liquor from the continuous crystallization chamber, extract from the extract receiver and concentrator, diluted extract, or from extract solution that is concentrated at any point in the continuous extraction unit. The concentrated solution is delivered through a constricted orifice of a least one concentrated solution inlet 1206 with the inlet rate controlled by a concentrated solution inlet valve 1208. The concentrated solution inlet 1206 delivers the concentrated solution onto the top of one or more annular chromatography columns 1212 that comprises a stationary phase packing between two radial barriers 1222 and 1224 that retain the stationary phase packing. The continuous rotating annular chromatograph can have a plurality of annular chromatography columns 1212 that are concentric, where a plurality of concentrated solution inlets 1206 delivers the appropriate amount of concentrated solution to each of the annular chromatography columns 1212, proportionally to their volume of stationary phase packing. The rotating part of the rotating annular chromatograph 1200 can be rotating annular chromatography columns 1212 or rotating concentrated solution inlets 1206. The annular chromatography columns 1212 can also be partitioned by concentric barriers the entire length of the columns to inhibit radial diffusion of the components.

The chromatography is driven by the flow of solvent introduced on the annular chromatography columns 1212 form the same face as the concentrated solution is introduced through one or more solvent inlet ports 1202 with the flow controlled by a valve 1204. Although the rotating annular chromatograph 1200 is shown with the solvent flow from the top to the bottom in FIG. 7, the solvent and concentrated solution can be introduced from the bottom with solvent and solution flowing to the top. At the exit end of the annular chromatography columns 1212 the stationary phase packing by a filter (not shown) where a plurality of outlet ports 1214 are situated such that a chosen angular portion of the annular chromatography columns 1212 allows collection of fluid over that angular portion, for example, as shown in FIG. 7, twenty outlet ports 1214 are situated to collect all fluid that is in an 18 degree slice of the exiting face of the annular chromatography column 1212. FIG. 7 shows ten of the twenty outlet ports with optional two way valves 1216 that can be used to control the flow rate to assure uniform flow from the annular chromatography column 1212 over its entire circumference. The fluid coming through the outlet ports 1214 is analyzed by a solute detector 1218, for example, an infrared spectrometer cell or any other part of a detector that permits analyzing a solute's identity almost immediately in real time, and, potentially, the degree to which it is a mixture of solutes. The signal from the infrared spectrometer cell is provided to an infrared spectrometer and a microprocessor programmed to control a product discernment valve 1220 that directs the fluid to a conduit for delivery to a product solute concentrating and collecting device, return clean solvent into the continuous extraction unit, or direct a solution with mixed components to other isolators or collectors. A plurality of continuous rotating annular chromatographs 1200 can be included.

Figure 8:
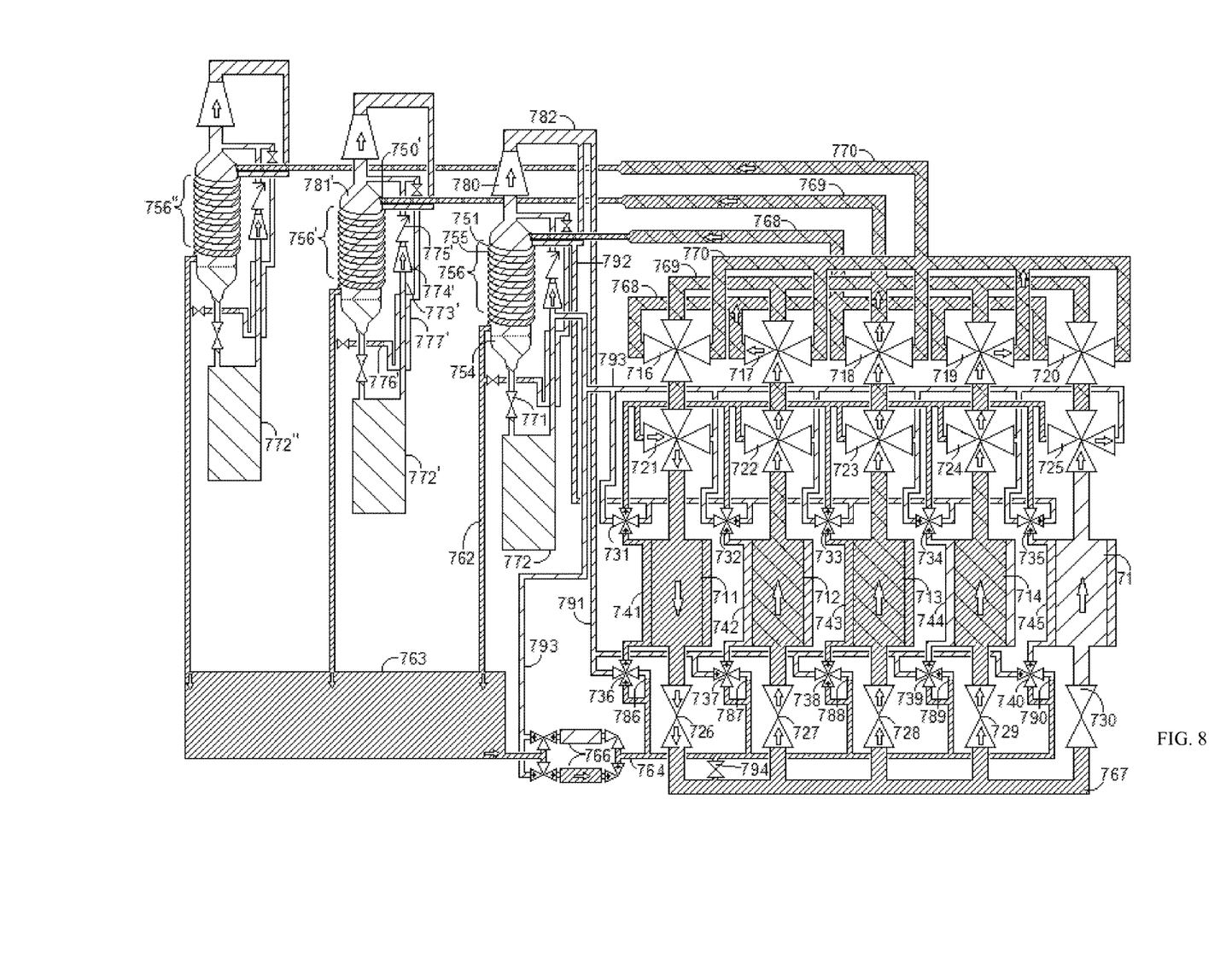
FIG. 8 shows a schematic drawing of a continuous extraction system, according to an embodiment of the invention.

In an embodiment of the invention, by using a plurality of heat exchangers, and optionally a plurality of compressors, the continuous extraction can isolate a plurality of different extracts comprising different proportions of the extractable components from a given extractable material with a single solvent or mixture of solvents based upon the degree of solubility of the different components and any effect of the partitioning of the various components into a solution higher or lower in the more readily extracted component. In this manner one product extract can predominately include the most soluble component or components, another product extracts extract can predominately include the least soluble component or components, and one or more additional extracts can include various proportions of these or be predominately of a component that has some intermediate solubility. In this manner, the different products result from a specific volume of solvent that has passed through an extraction chamber with that extraction solution directed to a desired heat exchanger followed by one or more subsequent volumes of solvent passed through the extraction chamber and directed to one or more other heat exchanges where the specific desired extract composition is to be isolated. As desired, the plurality of heat exchanges can be coupled with the means to selectively heat or cool the solvent and/or the extraction chambers for periods of time during extraction of a certain fraction of the components to enhance the selectivity of extraction during the passage of a particular amount of solvent to a particular heat exchanger. A continuous extraction system, according to an embodiment of the invention, is illustrated in FIG. 8. Though not shown, isolators, as indicated above, can be inserted into any fluid stream that contains an extract. Again, optionally, flow meters, sensors, consolidators, heat exchangers, additional valves, or other components can be included in the continuous extraction system.

As illustrated in FIG. 8, the continuous extraction system comprises a multiplicity of jacketed extraction chambers 711, 712, 713, 714 and 715. Fluid from solvent reservoir 763 is directed through an optional drying unit 766 where the fluid is passed through a desiccant or other means of drying, for example, freezing or osmotic means, prior to introduction to conduit 764 that directs the ambient temperature solvent to any one or more of a series of optional jacket inlet valves, 736, 737, 738, 739, and 740, which, can be excluded if no temperature control is needed or, alternately, can be substituted with heat exchangers, not shown, that are a conduit for the solvent that is to enter the extraction chambers 711, 712, 713, 714 and 715. The drying unit 766 is constructed to have one portion in line with the fluid flow to conduit 764, where the other portion having residual solvent removed into the low pressure vapor conduit 793 that is in communication with evacuating compressor 774. Note that the three heat exchangers 756, 756', and 756'' and all of their features have the same numbers with the number labeled to the feature only in one of the three heat exchangers in FIG. 7. As illustrated, valve 736 is aligned to have the ambient temperature solvent enter jacket 741 of extraction chamber 711, which is under the condition where the solvent exits through jacket outlet valve 731 through a conduit to valve 721 where it is directed into and through extraction chamber 711 having plant material that is, as desired, spent or nearly spent of the extract, where after flow through valve 726 into conduit 767, as shown, extraction chamber 711 experiences three fold the individual fluid flow rate of extraction chambers 712, 713, and 714. A nearly spent chamber may be advantageous when the least soluble component will subsequently partition and concentrate in other extraction chambers. In other configurations the transport of solvent from conduit 764 to conduit 767 through valve 794 is preferable. As illustrated in FIG. 7, three compressors 780, 780' and 780'' are employed; however, there may be more than one heat exchanger feeding a single compressor; for example, all three heat exchangers could be plumbed to a single compressor.

Jacket inlet valves 736, 737, 738, 739, and 740 are configured to allow ambient temperature solvent to be selected for introduction into extraction chamber jackets 711, 712, 713, 714, and 715, respectively; and independently, either the ambient temperature solvent from conduit 764, forces the solvent through thermal expansion valve 786, 787, 788, 789, and 790 for evaporative cooling of the jackets, or hot high pressure vapor from conduit 791. As illustrated, simultaneously, extraction chambers, 714, 713, and 712 are cooled, maintained at ambient, and heated, respectively, where early extract, middle extract, and late extract, respectively, can be optimized for isolation of three different extract products with three different compositions. In this configuration, cool early extract is carried from extraction chamber 714 in early extract solution through exit valve 724 into return selection valve 719 where it is directed to early extraction solution conduit 770 to the thermal expansion valve 750" of expansion chamber 751" of heat exchanger 756". The early extract is collected in extract receiver and concentrator 772", which is connected via concentrator conduit 773" to concentrating and evacuating compressor 774" where concentrator conduit 773" passes through condenser 777" that is cooled by passing some solvent from conduit 762" through thermal expansion valve 776" with the cold low pressure vapor discharged into trap 781" of heat exchanger 756".

In this configuration, ambient temperature middle extract is carried from extraction chamber 713 in middle extraction solution through exit valve 723 into return selection valve 718 where it is directed to middle extraction solution conduit 769 to the thermal expansion valve 750' of expansion chamber 751' of heat exchanger 756'. The middle extract is collected in extract receiver and concentrator 772', which is connected via concentrator conduit 773' to concentrating and evacuating compressor 774' where concentrator conduit 773' passes through condenser 777' that, optionally, is cooled by passing some solvent from conduit 762' through thermal expansion valve 776' with the cold low pressure vapor discharged into trap 781' of heat exchanger 756'.

In this configuration, heated late extract is carried from extraction chamber 712 in late extract solution through exit valve 722 into return selection valve 717 where it is directed to middle extraction solution conduit 768 to the thermal expansion valve 750 of expansion chamber 751 of heat exchanger 756. The early extract is collected in extract receiver and concentrator 772, which is connected via concentrator conduit 773 to concentrating and evacuating compressor 774 where concentrator conduit 773 passes through condenser 777 that is not cooled by passing some solvent from conduit 762 through thermal expansion valve 776 with the cold low pressure vapor discharged into trap 781 of heat exchanger 756.

As shown in FIG. 8, extraction chamber 715 is under evacuation of residual solvent, where outlet valve 725 is aligned to evacuating compressor 774. Jacket inlet valve 740 can be aligned to receive hot high pressure vapor from conduit 791 and direct it through extraction chamber jacket 745 and through jacket outlet valve 735 into conduit 792 to expansion chamber 751 of heat exchanger 756. Although not shown, optionally, a consolidator of the structure shown in FIG. 2 or of any other structure and, optionally, an absorbent for residual extract, can be included between the low pressure conduit and the compressor to assure that only the desired solvent enters the compressor.

Figure 9:
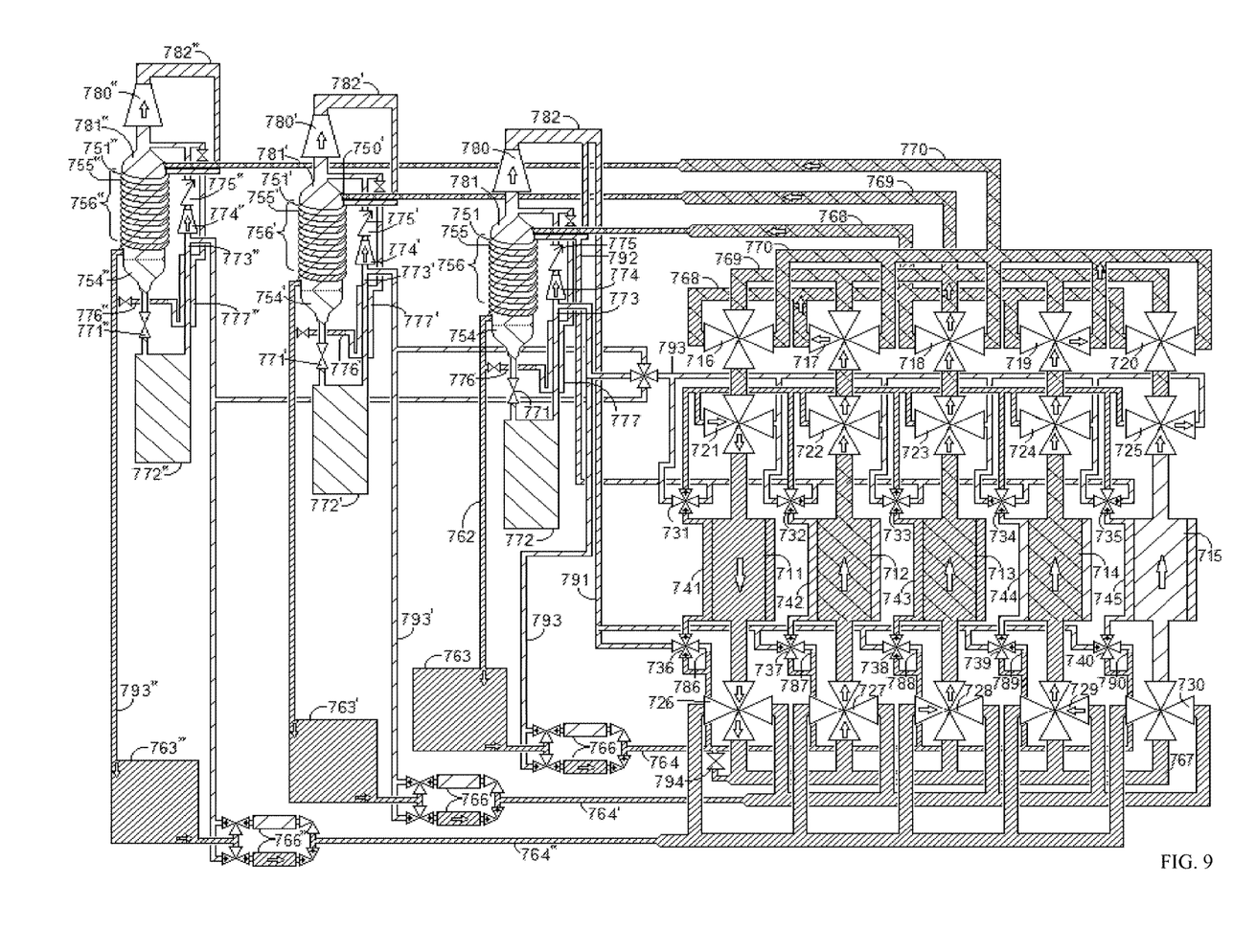
FIG. 9 shows a schematic drawing of a continuous extraction system, according to an embodiment of the invention.

FIG. 9 shows a continuous extraction system similar to that of FIG. 8 and uses the same numbering system to indicate the component of a given function; however, the continuous extraction system is configured to employ a plurality of different solvents. Again the system is shown comprising a multiplicity of optional jacketed extraction chambers 711, 712, 713, 714 and 715, which, can be excluded if no temperature control is needed or, alternately, can be substituted with heat exchangers, not shown, that are a conduit for the solvent that is to enter the extraction chambers 711, 712, 713, 714 and 715. However, the system permits employment of a plurality of different solvents. Fluids from solvent reservoirs 763, 763', and 763", downstream from compressors 780, 780', and 780", where each fluid can be different solvents (or solutions), are independently directed through optional drying units 766, 766', and 766" prior to introduction to conduits 764, 764', and 764" where for a primary solvent, conduit 764 is directed to any one or more of a series of jacket inlet valves, 736, 737, 738, 739, and 740. The drying units, 766, 766', and 766" are constructed to have one portion in line with the fluid flow to conduit 764, 764', and 764", where the other portion having residual solvent removed into the low pressure vapor conduits 793, 793', and 793" that are in communication with evacuating compressors 774, 774', and 774". As illustrated, valve 736 is aligned to have the ambient temperature solvent enter jacket 741 of extraction chamber 711, which is under the condition where the solvent exits through jacket outlet valve 731 through a conduit to valve 721 where it is directed into and through extraction chamber 711 having plant material that is, as desired, spent or nearly spent of the extract, where after flow through valve 726 into conduit 767, as shown, extraction chamber 711 experiences three fold the individual fluid flow rate of extraction chamber 712. In other configurations the transport of solvent from conduit 764 to conduit 767 through valve 794 is preferable.

Jacket inlet valves 736, 737, 738, 739, and 740 are configured to allow ambient temperature solvent to be selected for introduction into extraction chamber jackets 711, 712, 713, 714, and 715, respectively; and independently, either the ambient temperature solvent from conduit 764, forces the solvent through thermal expansion valve 786, 787, 788, 789, and 790 for evaporative cooling of the jackets, or hot high pressure vapor from conduit 791. As illustrated, simultaneously, extraction chambers, 714, 713, and 712 are cooled, maintained at ambient, and heated, respectively, where early extract, middle extract, and late extract, respectively, can be optimized for isolation of three different extract products.

While the primary solvent is employed in extraction chamber 712, a second solvent is employed in extraction chamber 713 and a third solvent is employed in extraction chamber 714. When valves 716 through 730, are properly aligned, the extraction chambers can employ different solvents in any combination. In this manner, plant material, or other extractable material, can experience various solvents sequentially to extract components that are soluble in one or more solvents. For example, in this manner when undesired components are soluble in a first solvent that is not a solvent for one or more desired component of the plant material, extraction can be carried out with the first solvent, the solvent removed as indicated for a plant material in extraction chamber 715, and then a second solvent that is a good solvent for desired components can be used to remove the desired components free from the undesirable components that were removed by the first solvent. The second solvent can be removed, and, after complete removal of the desired product, a third solvent can be employed to extract one or more other desired components that are not soluble in the first or second solvents. Although illustrated for three solvents, by the addition of compressors and the required accompanying components, as illustrated in FIG. 8 for the three solvent system, as many solvents as are desired can be included. Although not illustrated, the system can be plumbed with appropriate valve type, placement and/or plurality to permit any of the solvents to be introduced and removed such that various solvents can be employed as a heat exchanging fluid in any of the extraction chamber jackets 741, 742, 743, 744, and 745. Although not shown, optionally, a consolidator of the structure shown in FIG. 2 or of any other structure and, optionally, an absorbent for residual extract, can be included between the low pressure conduit and the compressor to assure that only the desired solvent enters the compressor.

We claim:

1. A continuous extraction, concentration and isolation unit, comprising:
    at least one extraction chamber, wherein each of the at least one extraction chamber comprises one or more valves to direct a fluid flow, and whereby the at least one extraction chamber is configured to contain an extractable material for formation of at least one extract solution comprising at least one solute and at least one liquid solvent,
    at least one heat exchanger where each of the at least one heat exchanger comprises:
        least one expansion chamber comprising a solution inlet positioned downstream of the at least one extraction chamber, wherein the solution inlet consists of at least one expansion valve to promote a pressure drop, whereby a vaporized solvent forms from at least one of the at least one extract solution with aerosolization, coalescence, and consolidation of the at least one solute as a liquid extract or as a concentrated solution extract; and
        at least one condenser, wherein the vaporized solvent is condensed to the liquid solvent, wherein heat from the at least one condenser is absorbable by the at least one expansion chamber;
    at least one compressor, each positioned upstream of the at least one condenser of at least one of the at least one heat exchanger and at least one of the at least one extraction chamber, and downstream of at least one of the at least one expansion chamber; and,
    at least one pump, at least one extract removal valve, or any combination thereof for continuously or periodically removing the at least one extract without disruption of the fluid flow from each of the at least one expansion chambers; and
    one or more means of concentrating different chemical components from the extractable material comprising one or more controlling valves capable of directing one of a plurality of the at least one liquid solvent to at least one of a plurality of the at least one extraction chamber wherein each of the at least one extraction chamber is in fluid communication with one of the plurality of the at least one solvent, each of the plurality of solvents is employed with at least one of the plurality of the at least one heat exchanger; and,
    one or more means of isolating different chemical components from the extractable material is selected from the group consisting of:
        a plurality of crystallizers for crystallization of a component of the extract or the extract solution;
        a plurality of precipitators for precipitation of an amorphous or a semi-crystalline solid of one or more components of the extract or the extract solution;
        at least one distiller for the distillation of one or more components of the extract or the extract solution;
        a plurality of ion exchange columns with an ion exchange medium for removal of one or more acidic, basic, or ion comprising components of the extract or the extract solution; and
        at least one continuous liquid chromatograph for the chromatographic separation of at least one component of the extract or the extract solution.

2. The continuous extraction, concentration and isolation unit of claim 1, further comprising an information processor comprising a programmed computer.

3. The continuous extraction, concentration and isolation unit of claim 2, wherein the information processor is interfaced with at least one sensor selected from the group consisting of a flow meter, a fluid density sensor, a refractive index detector, an infra-red, visible or ultraviolet light detector, a conductivity detector or any combination thereof, and/or the information processor is interfaced with at least one actuator selected from the group consisting of at least one of the one or more controlling valves, the at least one pump, at least one alarm, or any combination thereof.

4. The continuous extraction, concentration and isolation unit of claim 1, wherein the at least one extraction chamber is a continuous linear or circular tubular extraction chamber comprising a first door for filling a first portion of the continuous extraction chamber with the extractable material and a second door for removing the extractable material that has been extracted from a second portion of the continuous extraction chamber without stopping extraction in other portions of the continuous extraction chamber; and
    a selecting valve to direct the fluid flow between the portions of the continuous extraction chamber.

5. The continuous extraction, concentration and isolation unit of claim 1, further comprising at least one injector for the injection of chemicals.

6. The continuous extraction, concentration and isolation unit of claim 1, wherein the one or more means of concentrating different chemical components from the extractable material further comprising:
    one or more controlling valves to direct the liquid solvent or the vaporized solvent to a jacket of the at least one extraction chamber and/or to a solvent heat exchanger situated before the extraction chamber for cooling or heating the contents of the at least one extraction chambers to a desired temperature, wherein the extract solution formed at the desired temperature is directed to one of a plurality of the at least one heat exchanger.

7. The continuous extraction, concentration and isolation unit of claim 1, wherein the at least one extraction chamber is a plurality of the at least one extraction chamber wherein each of the plurality of extraction chambers is removable and replaceable with an equivalent extraction chamber without disruption of fluid flow through at least one of the plurality of the at least one extraction chamber of the continuous extraction, concentration and isolation unit.

8. A method of extraction, concentration, and isolating at least one soluble component from extractable material, comprising:
    providing a continuous extraction, concentration and isolation unit according to claim 1, and
    flowing at least one liquid fluid comprising at least one liquid solvent through the continuous extraction, concentration, and isolation unit.

* * * * *